Feb. 23, 1954 M. S. SAHL 2,670,155
SCOOTER AIRPLANE
Filed Dec. 13, 1950 2 Sheets-Sheet 1
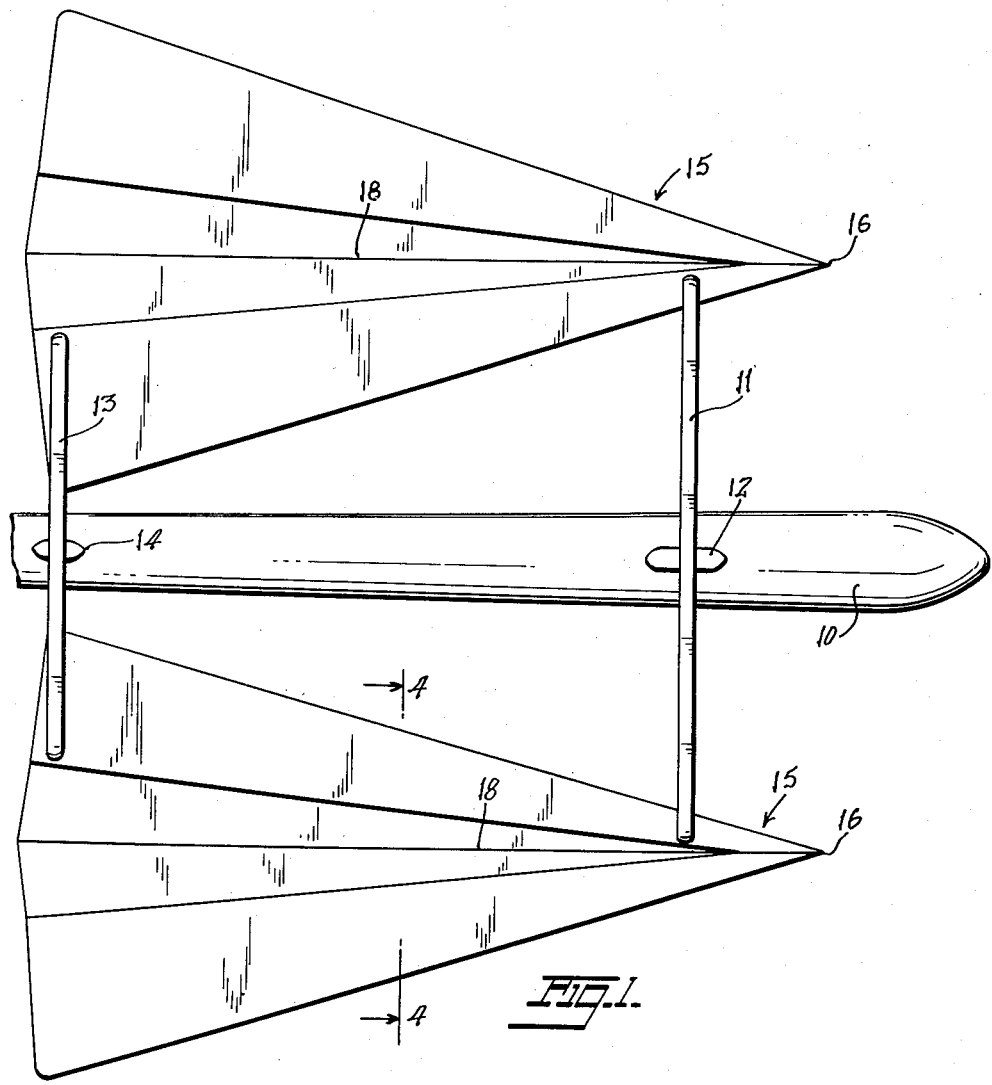
INVENTOR.
MOODY S. SAHL
BY
ATTORNEY Feb. 23, 1954     M. S. SAHL     2,670,155
SCOOTER AIRPLANE
Filed Dec. 13, 1950     2 Sheets-Sheet 2
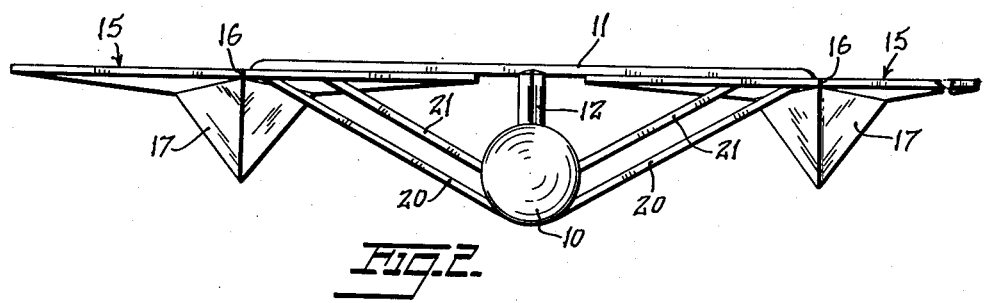
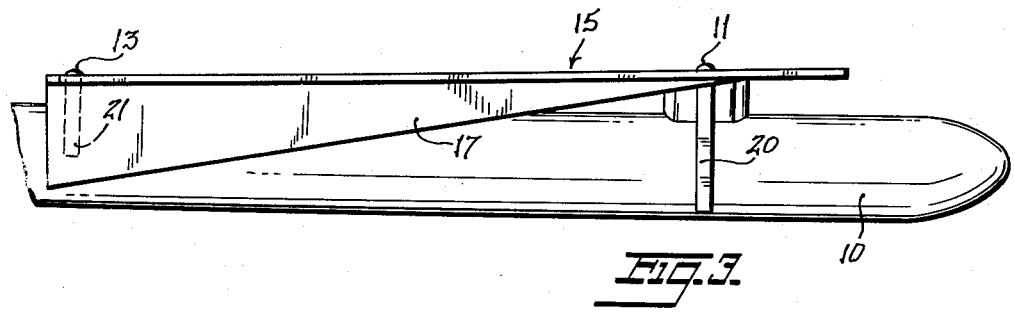
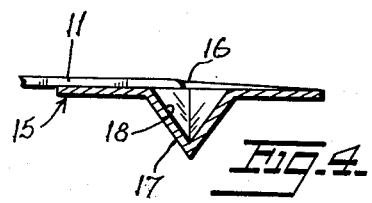
INVENTOR.
Moody S. Sahl
BY
*Zoltan Holecek*
ATTORNEY Patented Feb. 23, 1954

2,670,155

UNITED STATES PATENT OFFICE 2,670,155

SCOOTER AIRPLANE

Moody S. Sahl, Chicago, Ill.

Application December 13, 1950, Serial No. 200,565

5 Claims. (Cl. 244—13)

This invention relates to new and useful improvements in airplane wing construction.

One object of the invention is the provision of a wing structure in which airfoil drag is reduced to a minimum.

Another object of the invention is to construct the wings in such manner that the normal rounding of the leading edges is eliminated.

Another object of the invention is to construct the wings in such manner that the same are capable of greater durability than heretofore.

Still another object of the invention is the provision of means for materially increasing the lift of the wings, said means also being effective to prevent side slips.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a plan view of the wing structure as applied to a conventional fuselage.

Fig. 2 is a frontal elevation of the wing structure.

Fig. 3 is a side elevation of the wing structure.

Fig. 4 is a fragmentary sectional view on line 4—4 of Fig. 1.

Referring now to the drawings wherein one embodiment of the invention is illustrated, the reference numeral 10 indicates an ordinary cigar-shaped airplane fuselage. According to the invention, the wing structures do not have their longitudinal axes extending at substantially right angles to the fuselage but rather have the said longitudinal axes disposed in parallel vertical planes to the axis of the fuselage.

A front boom 11 extends transversely of the fuselage 10 and at its center is secured on a structure 12 projecting upward from the fuselage a short distance from the forward end thereof. A similar rear boom 13 has its center secured on a structure 14 which projects upward from fuselage 10 a shorter distance than structure 12. At either end the booms 11 and 13 are secured atop a wing 15 which at its leading edge comes to a point as at 16. Each wing 15 broadens equally on both sides of the longitudinal axis thereof as it extends rearward and slightly downward, the widest portion thereof being at the rear boom 13. Disposed along the longitudinal axis of each wing 15 is a V-shaped keel 17 which tapers in size and width from the trailing edge of the wing where it is at its largest, to a point near the leading edge of the wing where it becomes non-existant. As shown, the keel 17 forms an identically shaped trough 18 in the upper edge of the wing. The booms 11 and 13 serve as partial supports for the wings 15 which are further supported by front and rear struts 20 and 21 which extend outward from the fuselage at an upward inclination to the under sides of the wings, preferably at the inner edges of the keels 17.

Any desired means for propelling the aircraft may be provided.

The construction is such that as the airplane moves through the air with the leading edges of the wings 15 tilted upward, air banks up beneath the wings against the keels 17. At the same time a partial vacuum is created above the upper surfaces of the wings, particularly in the troughs 18. The air pressure on the under sides of the wings therefore tends to lift the latter. In obvious fashion the keels 17 effectively prevent side slipping, and the distribution of the weight of fuselage 10 below the wings 15 prohibits tipping over of the plane.

Air drag is minimized by the action of the keels 17 and troughs 18 to feed the air beneath the wings rearward at the outer sides of the keels and the air atop the wings rearward through the troughs 18, the streams of air thus merging smoothly.

It will be seen, therefore, that with the construction described there is no need for rounding the leading edges of the wings.

While I have illustrated and described the preferred embodiment of my invention, it is to be understood that I do not limit myself to the precise construction herein disclosed and the right is reserved to all changes and modifications coming within the scope of the invention as defined in the appended claims.

Having thus described my invention, what I claim as new, and desire to secure by United States Letters Patent is:

1. Wing construction for an aircraft having an elongated fuselage, which comprises a pair of booms extending transversely of the fuselage one a distance behind the other, the forward one being centrally secured at a slightly greater distance above the fuselage than the rearward one, a wing secured to either end of the booms, each wing increasing in width from a point at its leading edge to its trailing edge just rearward of the rearmost boom, and a V-shaped keel in each said wing, each keel tapering in width as it extends forward, the longitudinal axis of each wing and associated keel being disposed in the same vertical plane.

2. Wing construction for an aircraft having an elongated fuselage, which comprises a pair of booms extending transversely of the fuselage one a distance behind the other, the forward one being centrally secured at a slightly greater distance above the fuselage than the rearward one, a pair of wings of equal length, one secured at either end of the booms and each in the form of a V with the apex as the leading edge and the longitudinal axis thereof parallel with that of the fuselage in plan view, and a V-shaped keel in each said wing tapering to a point adjacent the apex of the wing, the longitudinal axis of each wing and associated keel being disposed in the same vertical plane.

3. Wing construction for an aircraft having an elongated fuselage, which comprises a pair of booms extending transversely of the fuselage one a distance behind the other, the forward one being centrally secured at a slightly greater distance above the fuselage than the rearward one, a pair of wings of equal length, one secured at either end of the booms and each in the form of a V with the apex as the leading edge and the longitudinal axis thereof parallel with that of the fuselage in plan view, a V-shaped keel in each said wing tapering to a point adjacent the apex of the wing, the longitudinal axis of each wing and associated keel being disposed in the same vertical plane, and front and rear struts extending outwardly and upwardly from the fuselage to each wing at the inner edge of the keel.

4. Wing construction for an aircraft having an elongated fuselage, which comprises a pair of booms extending transversely of the fuselage one a distance behind the other, the forward one being centrally secured at a slightly greater distance above the fuselage than the rearward one, a pair of wings of equal length, one secured at either end of said booms and each in the form of a V with the apex as the leading edge and the longitudinal axis thereof parallel with that of the fuselage in plan view, and a V-shaped keel extending along the longitudinal axis of each wing, said keel forming a trough in the upper face of the wing and tapering from the trailing edge of the wing to a point shortly behind the leading edge of the wing, the longitudinal axis of each wing and associated keel being disposed in the same vertical plane.

5. Wing construction for an aircraft having an elongated fuselage, which comprises a pair of booms extending transversely of the fuselage one a distance behind the other, the forward one being centrally secured at a slightly greater distance above the fuselage than the rearward one, a pair of wings of equal length, one secured at either end of said booms and each in the form of a V with the apex as the leading edge and the longitudinal axis thereof parallel with that of the fuselage in plan view, a V-shaped keel extending along the longitudinal axis of each wing, said keel forming a trough in the upper face of the wing and tapering from the trailing edge of the wing to a point shortly behind the leading edge of the wing, the longitudinal axis of each wing and associated keel being disposed in the same vertical plane, struts extending outwardly and upwardly from the fuselage to each wing at the inner edge of the keel.

MOODY S. SAHL.

References Cited in the file of this patent

UNITED STATES PATENTS

| Number | Name | Date |
|---|---|---|
| 1,007,789 | Mobley | Nov. 7, 1911 |
| 1,016,609 | Carpenter | Feb. 6, 1912 |
| 1,758,377 | Schauman | May 13, 1930 |

FOREIGN PATENTS

| Number | Country | Date |
|---|---|---|
| 2,115 | Great Britain | July 19, 1867 |
| 798,274 | France | Mar. 2, 1936 |